United States Patent
Watson (10) Patent No.: US 10,008,782 B2
(45) Date of Patent: Jun. 26, 2018

(54) LOW COUPLING FULL-DUPLEX MIMO ANTENNA ARRAY WITH COUPLED SIGNAL CANCELLING

(71) Applicant: Huawei Technologies Co., Ltd, Shenzhen (CN)

(72) Inventor: Paul Robert Watson, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

(21) Appl. No.: 15/192,230

(22) Filed: Jun. 24, 2016

(65) Prior Publication Data
US 2017/0373403 A1 Dec. 28, 2017

(51) Int. Cl.
| | |
|---|---|
| *H01Q 1/24* | (2006.01) |
| *H01Q 21/06* | (2006.01) |
| *H01Q 9/04* | (2006.01) |
| *H01Q 1/48* | (2006.01) |
| *H01Q 21/00* | (2006.01) |
| *H04L 5/14* | (2006.01) |
| *H01Q 15/14* | (2006.01) |

(52) U.S. Cl.
CPC .......... *H01Q 21/062* (2013.01); *H01Q 1/243* (2013.01); *H01Q 1/48* (2013.01); *H01Q 9/04* (2013.01); *H01Q 21/00* (2013.01); *H01Q 21/06* (2013.01); *H04L 5/14* (2013.01); *H01Q 15/14* (2013.01)

(58) Field of Classification Search
USPC ......................... 343/797, 702, 770
See application file for complete search history.

(56) References Cited

U.S. PATENT DOCUMENTS

| | | | |
|---|---|---|---|
| 8,830,133 B2 * | 9/2014 | Weily | H01Q 1/38 343/767 |
| 2014/0368395 A1 | 12/2014 | Dauguet et al. | |
| 2015/0188240 A1 | 7/2015 | Eom et al. | |

FOREIGN PATENT DOCUMENTS

| | | |
|---|---|---|
| CN | 204375960 U | 6/2015 |
| WO | 2012008946 A1 | 1/2012 |

OTHER PUBLICATIONS

International Search Report for PCT/CN2016/097048 dated Mar. 1, 2017.

* cited by examiner

*Primary Examiner* — Jessica Han
*Assistant Examiner* — Hai Tran (57) ABSTRACT

A full-duplex 2×2 multiple-input multiple-output (MIMO) antenna array is provided. An antenna reflector defining an x-y plane provides a plurality of antenna elements on the reflector. The linear polarization elements of the antenna elements are arrange in orthogonal polarizations for each transmit and receive pair. The elements are aligned in the same direction for half the orthogonal pair. A pair of elements are aligned along an axis to provide two coupled phase offset signals at a third element. The third element is collinear to the element of the first element defining a line of symmetry and parallel the direction of the element of the second element. The antenna array provides improved isolation between orthogonal ports and between transmit and receive ports by providing coupled signal cancelling between ports. This technique also increases boresight radiated pattern gain, as an additional benefit.

24 Claims, 6 Drawing Sheets

LOW COUPLING FULL-DUPLEX MIMO ANTENNA ARRAY WITH COUPLED SIGNAL CANCELLING

TECHNICAL FIELD

The present disclosure relates to an antenna array implementation and in particular to a 2×2 Multiple-Input-Multiple-Output (MIMO) antenna array implementation.

BACKGROUND

Full-duplex antennas require high isolation between transmit (Tx) and receive (Rx) ports as data transmission and reception can occur at the same time at the same frequency. As a result of full-duplex transmission and reception the signal being transmitted can have the potential to overwhelm the other signals being received. In Multiple-Input-Multiple-Output (MIMO) array antenna implementations the antenna elements are arranged on a finite ground plane and within a relatively low profile (i.e., depth of the antenna), which imposes space limitations to the antenna design and element positioning and orientation. Accordingly, designs and implementations which can achieve high isolation between Tx and Rx ports within a limited space are desired.

SUMMARY

In accordance with an aspect of the present disclosure there is provided a full-duplex 2×2 multiple-input multiple-output (MIMO) antenna array comprising: an antenna reflector defining an x-y plane; a first antenna element mounted on the antenna reflector having a first linear polarization element oriented in a first direction and a second linear polarization element oriented in a second direction orthogonal to the first direction; a second antenna element mounted on the antenna reflector having a linear polarization element collinear to the first direction; a third antenna element mounted on the antenna reflector having a linear polarization element collinear to the second direction; and a fourth antenna element mounted on the antenna reflector in proximity with the first antenna element having a first linear polarization element parallel to the first direction and a second linear polarization element parallel to the second direction.

In a further embodiment of the antenna array signals generated from the first linear polarization elements of the first antenna element and fourth antenna element are coupled to cancel at the second antenna element.

In a further embodiment of the antenna array signals generated from the second linear polarization elements of the first antenna element and fourth antenna element are coupled to cancel at the third antenna element.

In a further embodiment of the antenna array the second antenna element is positioned along a line of symmetry defined by the first direction extending from the first linear polarization element direction and the third antenna element is positioned along a line of symmetry defined by the second direction extending from the second linear polarization element direction.

In a further embodiment of the antenna array wherein the first antenna element and fourth antenna element are aligned in an x-axis of the x-plane.

In a further embodiment of the antenna array the first direction and second direction are +45° and −45° to a y-axis respectively.

In a further embodiment of the antenna array the fourth antenna element is positioned below the first antenna element along the x-axis and the second and third antenna elements are positioned above the first antenna element relative to the x-axis.

In a further embodiment of the antenna array the second antenna element and third antenna element are aligned along an y-axis in the y-plane.

In a further embodiment of the antenna array the second antenna element and third antenna element are spaced apart on either side of the y-axis passing through a center of the first antenna element and the fourth antenna element.

In a further embodiment of the antenna array centers of each of the second antenna element and third antenna element are spaced apart along the y-axis by a distance of 0.95 λ in relation to the x-axis defined by the first antenna element and fourth antenna element, where λ is a frequency of the antenna array.

In a further embodiment of the antenna array the centers of the each of the second antenna element and third antenna element are spaced apart a distance of 0.95 λ above the first antenna element along the x-axis.

In a further embodiment of the antenna array the centers of the first antenna element and fourth antenna element are spaced apart by a distance of 0.66 λ along the x-axis.

In a further embodiment of the antenna array signals of the first linear polarization element of the first antenna element and fourth antenna element are 180° out of phase at the second antenna element and signals from the second linear polarization element of the first antenna element and fourth antenna element are 180° out of phase at the third antenna element.

In a further embodiment of the antenna array the first linear polarization element of the first antenna element and first linear polarization element of the fourth antenna element are coupled of a first port; the second linear polarization element of the first antenna element and the second linear polarization element of the fourth antenna element are coupled to a second port; the first linear polarization element of second antenna element is coupled to a third port; and the second linear polarization element of the second antenna element is coupled to a fourth port.

In a further embodiment of the antenna array the first port is coupled to transmitter input A; the second port is coupled to transmitter input B; the third port is coupled to receiver output A; and the fourth port is coupled to receiver output B.

In a further embodiment of the antenna array the first port is coupled to receiver output A; the second port is coupled to receiver output B; the third port is coupled to transmitter input A; and the fourth port is coupled to transmitter input B.

In a further embodiment of the antenna array the antenna elements are probe feed patch elements.

In a further embodiment of the antenna array the antenna elements are dipoles.

In a further embodiment of the antenna array the antenna elements are slot-coupled patch.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The following detailed description contains, for the purposes of explanation, various illustrative embodiments, implementations, examples and specific details in order to provide a thorough understanding of the invention. It is apparent, however, that the disclosed embodiments may be practiced, in some instances, without these specific details or with an equivalent arrangement. The description should in no way be limited to the illustrative implementations, drawings, and techniques illustrated below, including the designs and implementations illustrated and described herein, but may be modified within the scope of the appended claims along with their full scope of equivalents.

Embodiments are described below, by way of example only, with reference to FIGS. 1-6. Full-duplex antennas require very high isolation between Tx and Rx antenna ports (>45 dB isolation, which is 1/(31,000) power coupling) particularly in the 1.9 GHz to 2.3 GHz frequency range. To achieve the isolation the design of the antenna array requires careful consideration of element placement and orientation. The present disclosure provides a MIMO antenna array having 2×Tx and 2×Rx ports. Achieving 45 dB isolation is quite high on a finite ground plane (318 mm×183 mm, or 2.2*λ×1.3*λ, total patch area) and requires some special configuration to achieve this. In the implementation described the Tx and Rx ports are orthogonal polarized (+/−45 degree linear). The full-duplex 2×2 MIMO antenna array disclosed provides relatively low mutual coupling on a finite ground plane compared to existing solutions. The antenna array disclosed has linear polarized elements which are arranged along lines of symmetry, achieving inherently low coupling within half the array. The antenna array provides increased gain on 2 ports (e.g. Tx ports) by coupling the signals to cancel at the associated Rx port.

The antenna elements described utilize dual linear orthogonal polarized elements such as a probe-fed patch, dipole, slot-coupled patch element or any element that is linearly polarized with two orthogonal polarizations in the x-y plane (plane of reflector) can be used. The antenna element may utilize a structure such as described in provisional patent application No. 62/270,417 filed Dec. 21, 2015 the entirety of which is hereby incorporate by reference for all purposes. For a probe-fed patch configuration a low profile of 28 mm (0.2*λ) patch height may be achieved for the antenna array.

Figure 1:
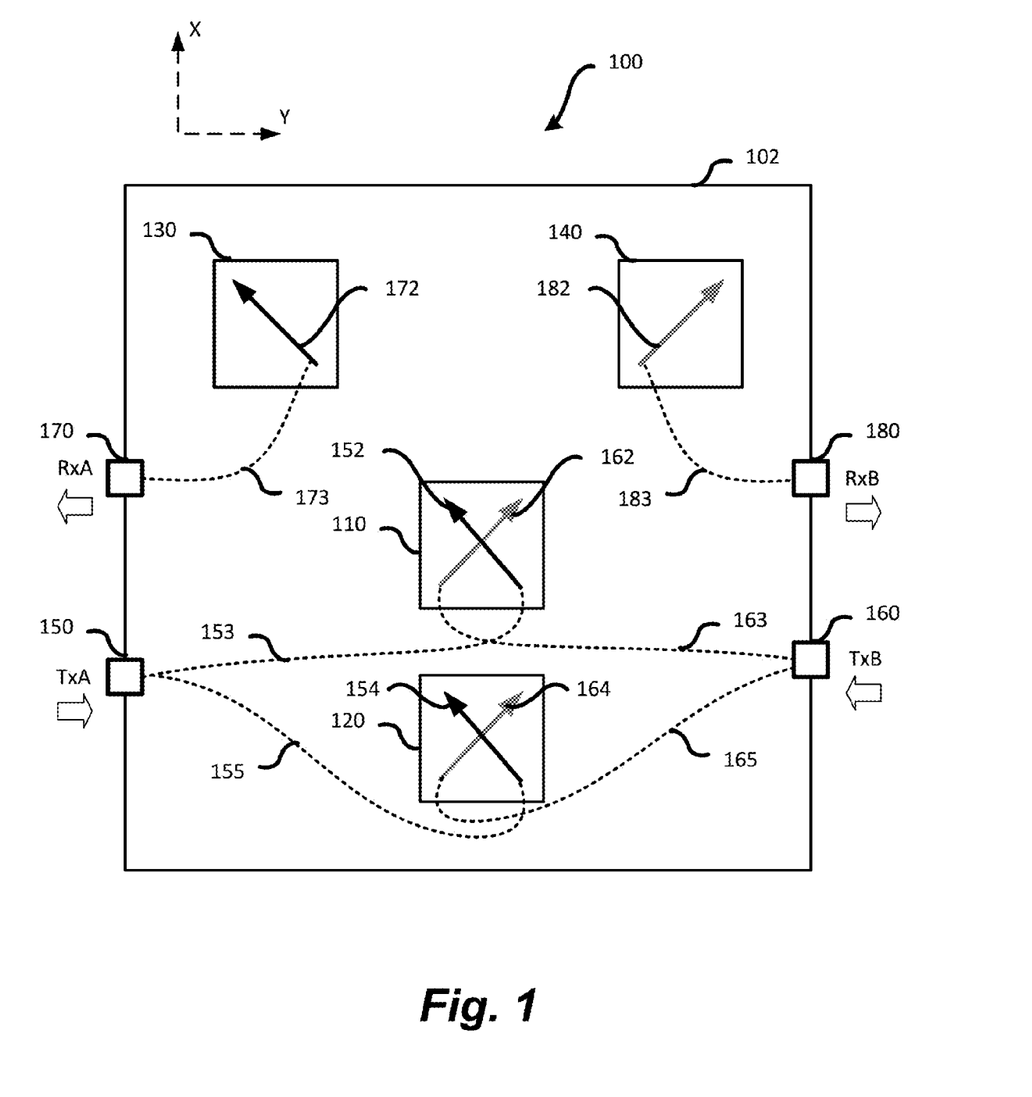
FIG. 1 shows is a schematic diagram of a full duplex 2×2 MIMO antenna array, according to an embodiment.

With reference to FIG. 1, a schematic diagram of a 2×2 MIMO antenna array 100 is shown in a top view. Strongly coupled transmit ports are physically arranged to create coupled signals to cancel at an associated receive port, creating high isolation within the strongly coupled ports. The antenna array 100 provides line of symmetry from the first transmit element to defining positioning of the receive element in addition to be symmetric about a center axis. The antenna array 100 makes use of symmetry to reduce coupling between antenna ports of orthogonal linear polarization. The configuration provided also increases boresight radiated pattern gain, as an additional benefit. The antenna array 100 comprises an antenna reflector surface 102 defining an x-y plane having the at least four antenna elements 110, 120, 130, 140 mounted thereon. Each antenna element 110, 120, 130, 140 is coupled to one or more ports 150, 160, 170, 180 for transmitting or receiving associated signals. In the embodiment shown, the antenna array 100 comprises two transmit antenna elements 110, 120 and two Rx antenna elements 130, 140 Antenna elements 110, 120 each comprise two orthogonal probes or elements 152, 162 and elements 154, 164 respectively. The elements 152, 162 are orthogonally oriented at +/−45° of a x-axis of the reflector 102 providing two independent co-located antennas using the same conductive patch 110. The antenna elements 130 and 140 and associated elements 172 and 182 are aligned collinear to a lines of symmetry defined by the orientation of element 152 and 162. The orientation of elements 154 and 164 are parallel to the orientation of elements 152 and 162 but can also be aligned by approximate lines of symmetry relative to the orientation of elements 172 and 178.

Feeds 152,154 are coupled to transmit port TxA 150 by respective stripline 153, 155 to elements 110, 120. Feeds 162, 164 are coupled to transmit port TxB 160 by respective strip line 163, 165 to elements 110, 120. Antenna element 130 has an element 172 coupled to RxA 170 by stripline 173. The element 172 of element 130 is collinear with the element 152 of element 110 and parallel to element 154. Similarly, an antenna element 140 has an element 182 coupled to RxB 180 by stripline 183. The element 182 is collinear with the element 162 and parallel to element 164, and orthogonal to element 172. The stripline feeds 153, 155, 163, 165, 173, 183 can be provided on the underside of the antenna reflector 102 by a feed network of a printed circuit board (PCB) mounted (not shown) on the underside of the reflector 102. The elements may transition through vias or opening through the surface of the antenna reflector coupling to the antenna element structure.

Figure 2:
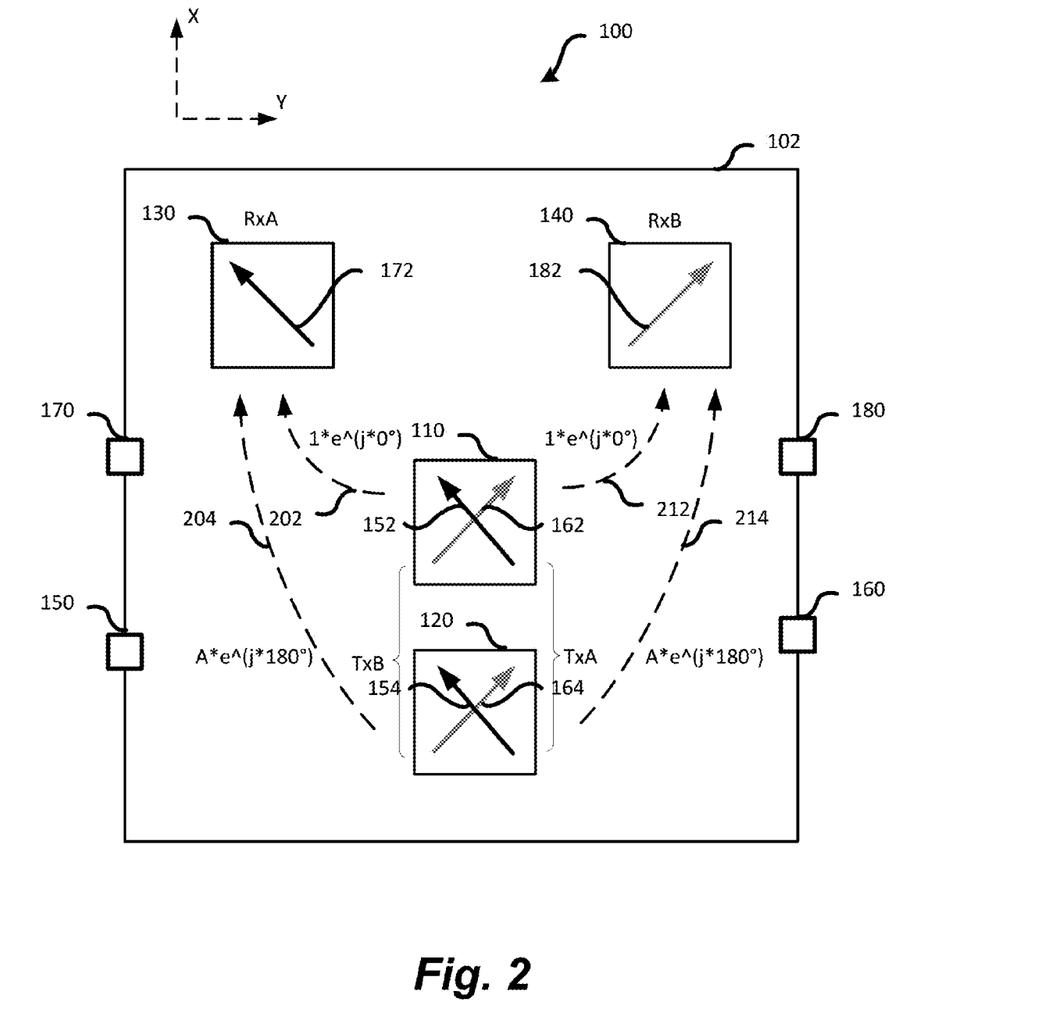
FIG. 2 shows a representation of coupled signal cancelling in the full-duplex 2×2 MIMO antenna array.

As shown in FIG. 2, the coupled signal 204 generated by the element 154 TxA element 120 arrives at RxA element 130 180° shifted in phase from signal 202 generated by element 152 of TxA element 110. The two signals 202, 204 are cancelled at element RxA 130 improving isolation between the associated input and output ports. Similarly the coupled signal 214 generated by the element 164 TxB element 120 arrives at RxB element 130 180° shifted in phase from signal 212 generated by element 162 of TxB element 110. The two signals 212, 214 are cancelled at the element RxB 140.

Figure 3:
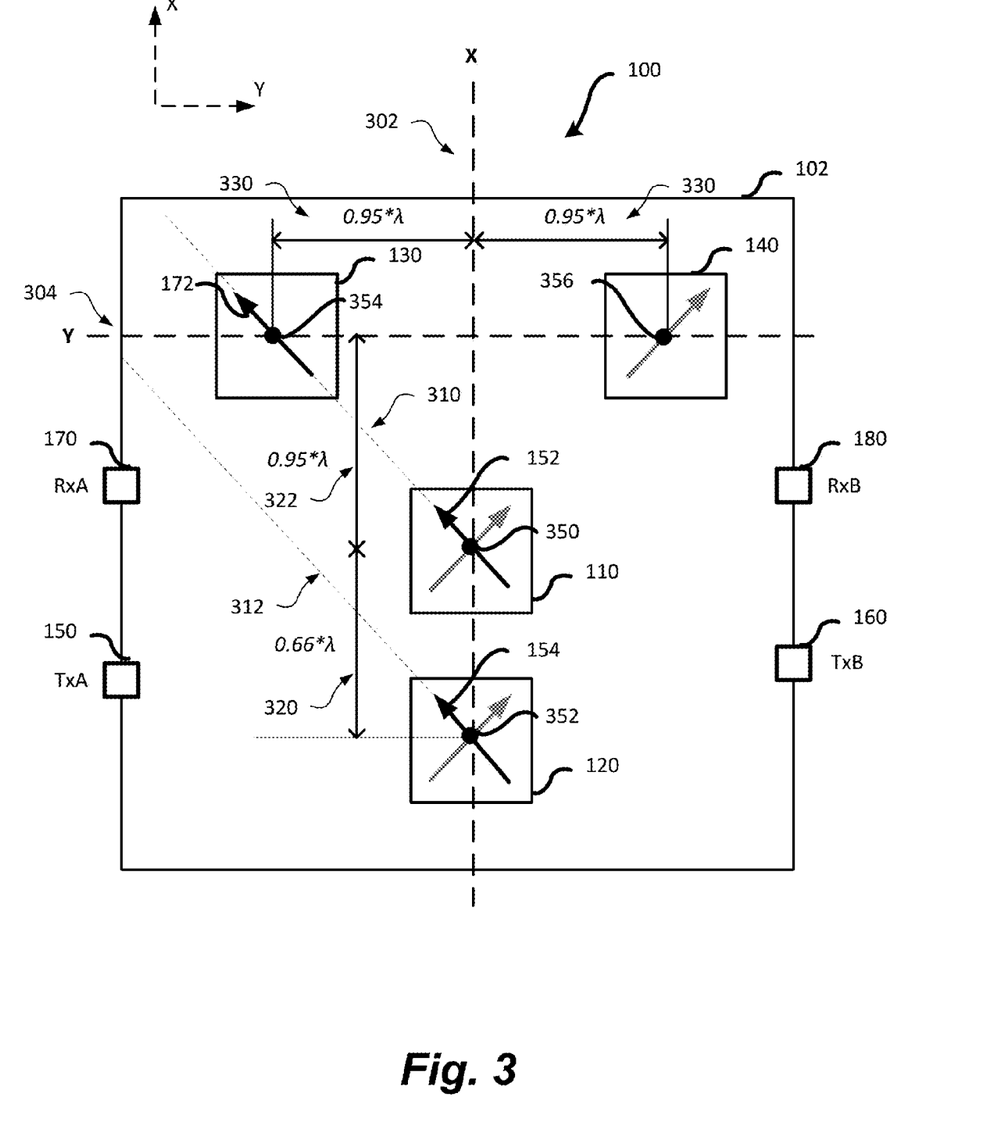
FIG. 3 shows a representation antenna element directions in the full-duplex 2×2 MIMO antenna array.

FIG. 3 shows a representation antenna element orientations in the 2×2 MIMO antenna array 100. This antenna array 100 makes use of symmetry to reduce coupling between respective transmit and receive antenna ports of orthogonal linear polarizations. Isolation between the ports in the same polarization, such as TxA and RxA are isolated through the use of coupled signal cancelling between pair of elements, such as Tx elements 110, 120, where the phase offset which is created by positioning of the two elements 110, 120 results in the signals cancelling at a $3^{rd}$ element 130 or element 140 depending on polarization. The two Tx elements 110, 120 also create a beam pattern which adds directivity (compared to a single element). Alternatively the pattern generated by the array 100 can also be modified to have an elevation tilt, if desired, by physically shifting the position of element 120 and exciting the element pair 110, 120 with a phase offset. The x-y plane of the reflector 102 defines a central vertical x-axis 302 and a horizontal y-axis 304. By maintaining the orthogonal polarizations between ports and common central axis of symmetry 302 aligned between two separate Tx elements 110, 120, the cross-polarity coupling remains low with each element and between elements. Note that the physical placement of the Tx elements 110, 120, results in coupling of signals to cancel at the Rx port of element 130 positioned in the same orientation. Providing for feeding the Tx elements 110, 120 in-phase (or near in-phase if down-tilt is required), creates a beam maxima at boresight. The configuration described allows the two Tx elements (e.g.: TxA 150 feeding elements 110, 120) to be positioned close enough to avoid large grating lobes.

In an embodiment of the antenna array 102, the centers 350, 352 of the two Tx elements 110, 120 are collinear and aligned along an x-axis 302 and the centers 354, 356 of the two Rx elements 130, 140 are collinear and aligned along a y-axis above the Tx elements 110, 120. The Rx elements 130, 140 are positioned above the first antenna element 110 on the x-axis 304 and spaced on either side of the y-axis 304 and the elements are oriented in the same direction as the respective Tx elements. In an embodiment the centers 354, 356 of the each of the Tx antenna elements 130, 140 are spaced apart along the y-axis 304 by a distance 330 of 0.95 λ, where A is a frequency of the antenna array, which would be equal to 135 mm at 2.1 GHz, in relation to the x-axis 302. The centers 354, 356 of the each element 130, 140 are spaced apart a distance 322 of 0.95 λ above the element 110 along the x-axis 302. The centers 350, 352 of two Tx elements 110, 120 can be spaced apart by a distance 320 of 0.66 λ along the x-axis, 302, which would be equal to 95 mm at 2.1 GHz. The center 354 of element 130 is collinear to the orientation of, and aligned along, a line of symmetry 310 defined by the associated element 152 orientation of element 110. The element orientation 154 of element 120 provide a parallel axis 312 for center 352. Lines of symmetry can also be extended for the other polarization towards element 140. Although the elements 110, 120, 130, 140 are described as being associated with Tx and Rx ports and associated elements, the allocation of the ports to the elements may be reversed so that there is one Tx element and two Rx elements associated with each pair of ports. The relative position of the Tx elements 110, 120 may be moved to modify the radiation pattern and providing a phase offset to the element 120 to compensate for phase variation when the element 120 is not placed at the optimal A position. Further a magnitude offset may be applied to individual feed probes to improve isolation.

Figure 4:
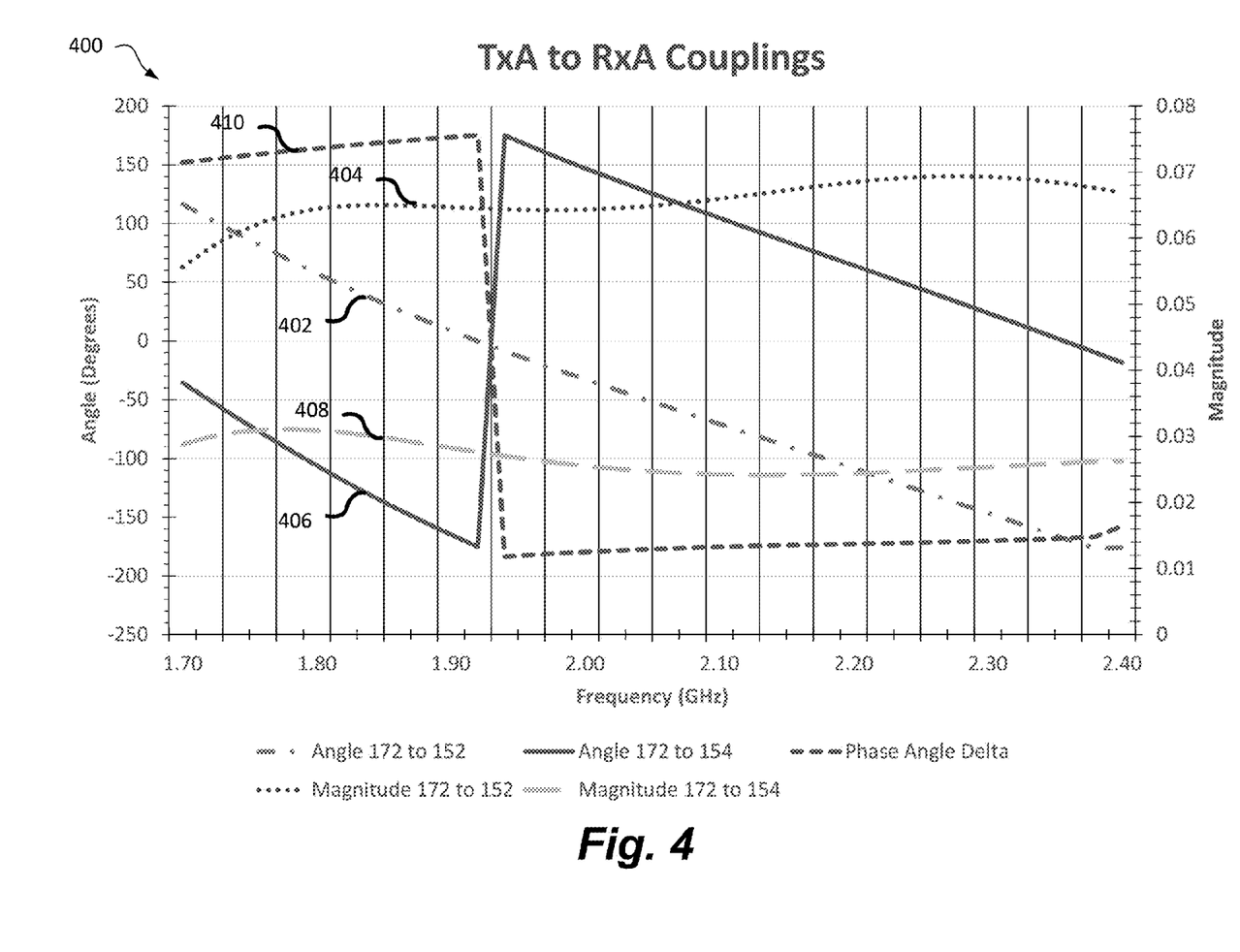
FIG. 4 shows a plot of coupling between TxA and RxA elements.
Figure 5:
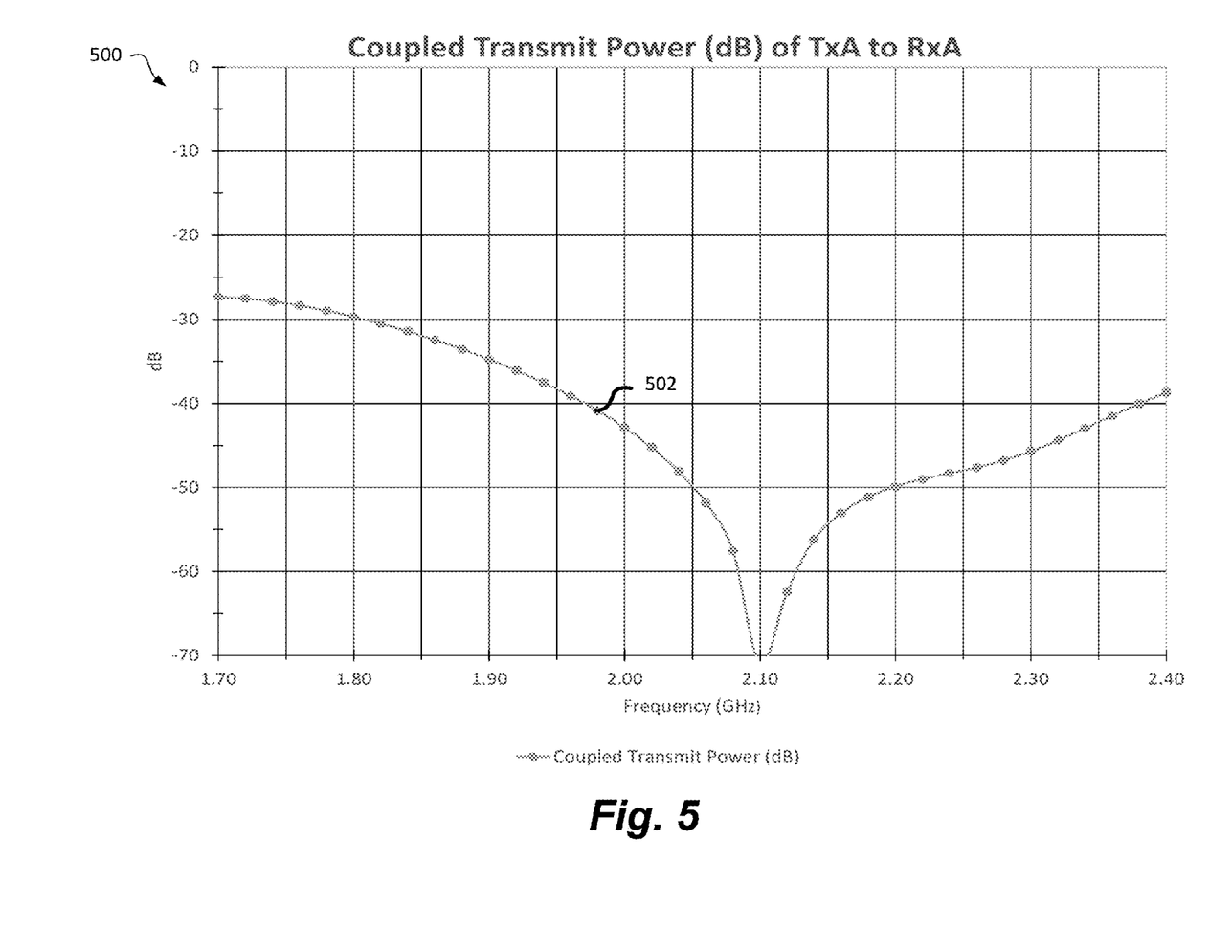
FIG. 5 shows a plot of coupled signal cancellation of TxA signal at RxA.
Figure 6:
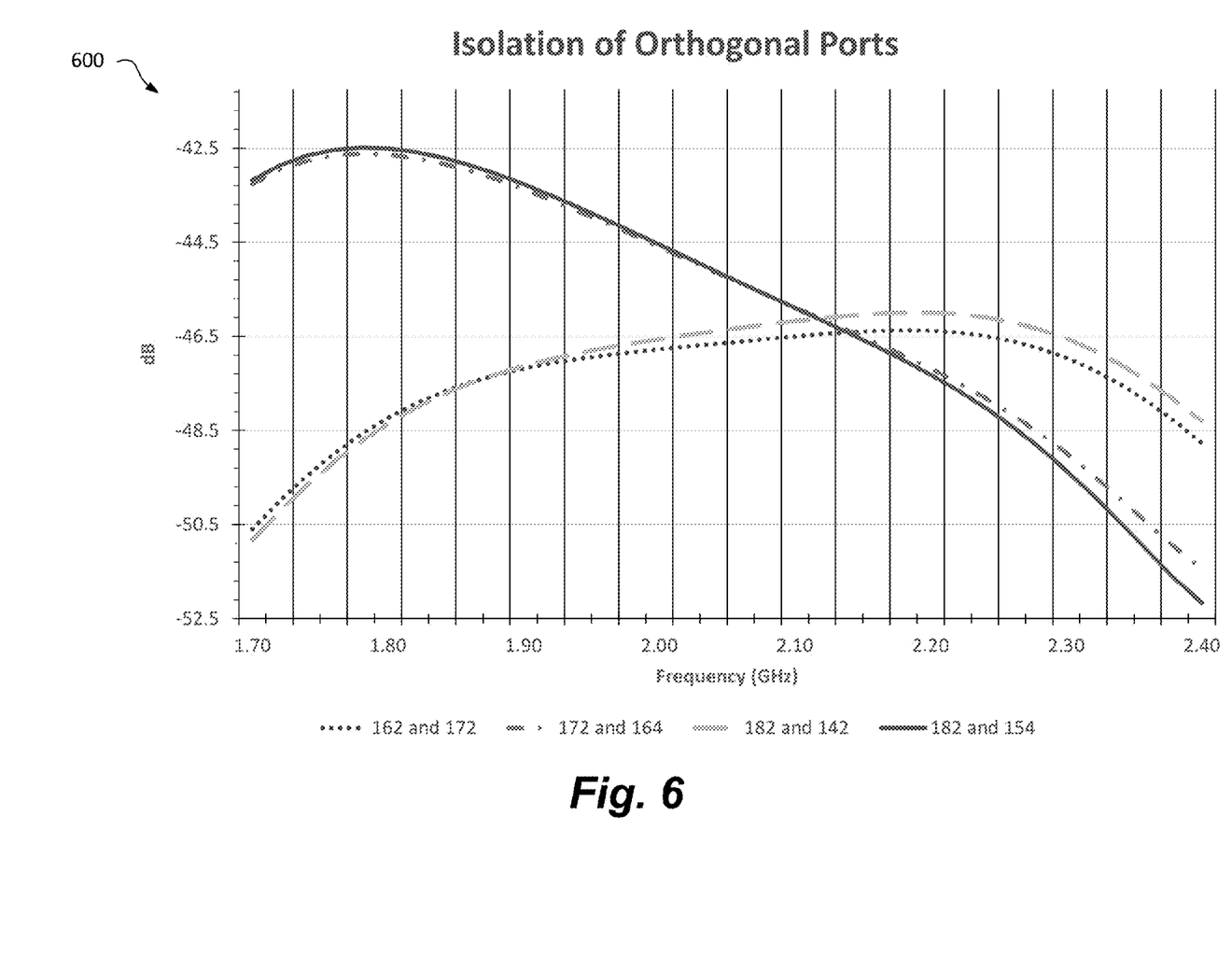
FIG. 6 shows a plot of isolation of orthogonal ports.

FIG. 4 shows a plot 400 of coupling between TxA and RxA elements. The coupling shown by the phase angle 402 between the element 172 and the element 152 element and the phase angle 406 between element 172 to element 154 provides a delta 410 of approximately 180°. The magnitude 406 between element 172 to element 152 and the magnitude between element 172 and feed 154 are non-equal which may require element offset to be applied to element 152 to provide equal desired cancellation. FIG. 5 shows a plot 500 of coupled signal cancellation of TxA signal at RxA. The coupled transmit power between the Tx port 150 and Rx port 170 is below 45 dB. FIG. 6 shows a plot 600 of isolation of orthogonal ports. Curve 602 is coupling between orthogonal polarization element 162 and element 172, curve 604 is the coupling between element 172 and element 164, curve 606 is the coupling between element 182 and element 152 and curve 608 is the coupling between element 182 and element 154. Each port provides isolation better than −45 dB to orthogonal elements.

It would be appreciated by one of ordinary skill in the art that the system and components shown in FIGS. 1-6 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

While in some embodiments specific numbers are provided for the dimensions, it should be apparent to a person skilled in the art that the design is not limited to the specific numbers and can be modified, for example, depending on the requirement of the finite ground plane, the frequency of operation, and other parameters.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including" and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g., "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

The invention claimed is:

1. A full-duplex 2×2 multiple-input multiple-output (MIMO) antenna array comprising:
   an antenna reflector defining an x-y plane;
   a first antenna element mounted on the antenna reflector having a first linear polarization element oriented in a first direction and a second linear polarization element oriented in a second direction orthogonal to the first direction;
   a second antenna element mounted on the antenna reflector having a linear polarization element collinear to the first direction;
   a third antenna element mounted on the antenna reflector having a linear polarization element collinear to the second direction; and
   a fourth antenna element mounted on the antenna reflector in proximity with the first antenna element having a first linear polarization element parallel to the first direction and a second linear polarization element parallel to the second direction,
   wherein signals generated from the first linear polarization elements of the first antenna element and fourth antenna element are coupled to cancel at the second antenna element.

2. The antenna array of claim 1 wherein signals generated from the second linear polarization elements of the first antenna element and fourth antenna element are coupled to cancel at the third antenna element.

3. The antenna array of claim 1 wherein the second antenna element is positioned along a line of symmetry defined by the first direction extending from the first linear polarization element direction and the third antenna element is positioned along a line of symmetry defined by the second direction extending from the second linear polarization element direction.

4. The antenna array of claim 1 wherein the first antenna element and fourth antenna element are aligned in an x-axis of the x-y plane.

5. The antenna array of claim 4 wherein the first direction and second direction are +45° and −45° to a y-axis of the x-y plane respectively.

6. The antenna array of claim 5 wherein the fourth antenna element is positioned below the first antenna element along the x-axis and the second and third antenna elements are positioned above the first antenna element relative to the x-axis.

7. The antenna array of claim 6 wherein the second antenna element and third antenna element are aligned along the y-axis of the x-y plane.

8. The antenna array of claim 7 wherein the second antenna element and third antenna element are each located at a point along a respective one of a pair of lines at +45 degrees and −45 degrees to the x-axis and passing approximately through a midpoint of the first and fourth antenna elements.

9. The antenna array of claim 8 wherein centers of each of the second antenna element and third antenna element are spaced apart along the y-axis by a distance of approximately 0.95 λ in relation to the x-axis defined by the first antenna element and fourth antenna element, where λ is a wavelength of a frequency of the antenna array.

10. The antenna array of claim 9 wherein the centers of each of the second antenna element and third antenna element are spaced apart a distance of approximately 0.95 λ above the first antenna element along the x-axis.

11. The antenna array of claim 10 wherein the centers of the first antenna element and fourth antenna element are spaced apart by a distance of 0.66 λ along the x-axis.

12. The antenna array of claim 1 wherein signals generated by the first linear polarization element of the first antenna element and fourth antenna element arrive 180° out of phase at the second antenna element and signals generated by the second linear polarization element of the first antenna element and fourth antenna element arrive 180° out of phase at the third antenna element.

13. The antenna array of claim 1 wherein:
the first linear polarization element of the first antenna element and first linear polarization element of the fourth antenna element are coupled of a first port;
the second linear polarization element of the first antenna element and the second linear polarization element of the fourth antenna element are coupled to a second port;
the linear polarization element of the second antenna element is coupled to a third port; and
the linear polarization element of the third antenna element is coupled to a fourth port.

14. The antenna array of claim 13 wherein:
the first port is coupled to receiver input A;
the second port is coupled to receiver input B;
the third port is coupled to transmitter output A; and
the fourth port is coupled to transmitter output B.

15. The antenna array of claim 13 wherein:
the first port is coupled to transmitter output A;
the second port is coupled to transmitter output B;
the third port is coupled to receiver input A; and
the fourth port is coupled to receiver input B.

16. The antenna array of claim 1 wherein the antenna elements are selected from one or more of:
probe feed patch elements;
dipoles; and
slot-coupled patch elements.

17. An antenna array, comprising:
a first pair of transmit elements polarized in a first polarization direction;
a first transmit port configured to feed the first pair of transmit elements approximately in-phase with a signal for transmission at a first wavelength;
a first receive element polarized in the first polarization direction, the first receive element being spaced apart from the first pair of transmit elements along the first polarization direction such that a distance from the first receive element to one of the transmit elements of the first pair of transmit elements is greater than a distance from the first receive element to the other one of the transmit elements of the first pair of transmit elements by approximately half of the first wavelength.

18. The antenna array of claim 17, further comprising:
a second pair of transmit elements polarized in a second polarization direction orthogonal to the first polarization direction, each transmit element of the second pair of transmit elements arranged with a respective transmit element of the first pair of transmit elements;
a second transmit port configured to feed the second pair of transmit elements approximately in-phase with a second signal for transmission at a second wavelength;
a second receive element polarized in the second polarization direction, the second receive element being spaced apart from the second pair of transmit elements along the first polarization direction such that a distance from the second receive element to one of the transmit elements of the second pair of transmit elements is greater than a distance from the second receive element to the other one of the transmit elements of the second pair of transmit elements by approximately half of the second wavelength.

19. The antenna array of claim 18 wherein signals transmitted from the first pair of transmit elements are coupled to cancel at the first receive element, and signals transmitted from the second pair of transmit elements are coupled to cancel at the second receive element.

20. The antenna array of claim 19 wherein the first and second pairs of transmit elements are aligned along an x-axis of an x-y plane.

21. The antenna array of claim 20 wherein the first polarization direction and second polarization direction are +45° and −45° to the x-axis respectively.

22. The antenna array of claim 21 wherein the first and second receive elements are symmetrically arranged on opposite sides of the x-axis.

23. The antenna array of claim 22 wherein the first and second receive elements are aligned along a y-axis of the x-y plane.

24. The antenna array of claim 18 wherein the first and second pairs of transmit elements and the first and second receive elements are selected from:
probe feed patch elements;
dipoles; and
slot-coupled patch elements.

* * * * *